US006208495B1

(12) United States Patent
Wieloch et al.

(10) Patent No.: US 6,208,495 B1
(45) Date of Patent: Mar. 27, 2001

(54) METHOD AND APPARATUS FOR INTERRUPTING A CURRENT CARRYING PATH IN A MULTIPHASE CIRCUIT

(75) Inventors: Christopher J. Wieloch, Brookfield, WI (US); David J. Benard, Newbury Park; Gernot Hildebrandt, Simi Valley, both of CA (US); Paul T. Nolden, Racine, WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/409,961

(22) Filed: Sep. 30, 1999

(Under 37 CFR 1.47)

Related U.S. Application Data

(62) Division of application No. 08/994,142, filed on Dec. 19, 1997.

(51) Int. Cl.[7] ........................ H02H 3/00
(52) U.S. Cl. ........................ 361/78; 361/93.1; 361/115
(58) Field of Search ........................ 361/78, 93.1, 115

(56) References Cited

U.S. PATENT DOCUMENTS 6,028,753 * 2/2000 Wieloch et al. ........................ 361/78

* cited by examiner

*Primary Examiner*—Stephen W. Jackson
(74) *Attorney, Agent, or Firm*—Patrick S. Yoder; John J. Horn; A. M. Gerasimow

(57) ABSTRACT

A multiphase circuit interrupter includes a plurality of power phase sections for establishing and interrupting electrical power carrying paths for a plurality of phases Each power phase section includes first and second conductive regions which contact one another to complete the current carrying path for the phase. The second conductive region is movable to an interrupted position to interrupt the path. An interphase current carrying path is established between the power phase sections to conduct electrical energy between the sections following a trip event in any one of the sections. The interphase current carrying path may be established by a conductive element extending between the power phase sections. Channels may be formed in the interrupter housing between the power phase sections to communicate conductive plasma generated during separation of the contact regions from one another between the power phase sections. The electrical energy conducted between the sections increases the rate at which the arcs are extinguished, contributes to protection of the load downstream of the device and results in more rapid interruption of power through all power phase sections.

20 Claims, 8 Drawing Sheets

METHOD AND APPARATUS FOR INTERRUPTING A CURRENT CARRYING PATH IN A MULTIPHASE CIRCUIT

This application is a divisional of application Ser. No. 08/994,142 filed Dec. 19, 1997.

BACKGROUND OF THE INVENTION

The present invention relates generally to the field of electrical circuit interrupter devices, such as circuit breakers, motor protectors and the like. More particularly, the invention relates to a method and apparatus for interrupting current in more than one phase of a multiphase circuit in response to an overcurrent or other trip condition occurring in one of the phases.

A considerable array of devices and methods are known for interrupting electrical power between conductors. Such devices include circuit breakers of various design and construction, electric motor protectors, and other overcurrent protective devices. In general, such devices provide a path for the flow of electrical power under normal operating conditions, and a mechanism for breaking the current path in the event of an actual or anticipated overcurrent, overtemperature, or other undesirable condition. The current path is typically established by a movable element, such as a pivotable arm carrying a first contact region, and a stationary conductor coupled to a second contact region. The contact regions are brought into contact with one another during normal operation, permitting electrical power to flow through conductors coupled to the first and second contact regions. A sensing device or actuator detects fault conditions and triggers movement of the arm to separate the contact regions from one another, thereby interrupting the current path between the conductors. In multiphase devices of this type, a similar arrangement is provided for each phase. Moreover, in the latter case, a trip mechanism typically links the mechanical elements of each phase to ensure that power is interrupted in all phases in the event of a fault in a single phase. A toggle or catch mechanism is generally provided to guard against rebound of the movable arm and recontact of the conductive regions.

Other types of circuit interruption devices include arrangements in which a movable conductive bridge or spanner carrying a pair of contacts extends between two stationary contact regions. When the device is installed in service, source and load conductors are coupled to the stationary contact regions. The bridge serves to complete a current carrying path between the conductors in normal operation. For interruption of current an actuator or interrupt initiation device forces the bridge element away from the stationary contact regions, generating arcs between the separating regions as the bridge element is displaced. A circuit interrupter of this type is described in U.S. Pat. No. 5,579,198, issued on Nov. 26, 1996 to Wieloch et al.

In conventional circuit interrupting devices, such as circuit breakers, a mechanical or electromechanical assembly is associated with the movable contact support to catch or bias the contact support in a non-conducting position following a trip event and to retain the support in the non-conducting position until the device is manually or automatically reset. Common mechanical catch and retaining assemblies included toggle arrangements, snap-action structures and the like, designed to move rapidly to a retaining position following the trip event. An important function of such assemblies is to deploy with sufficient rapidity to prevent the movable contact from bouncing or returning to its conductive position, thereby re-establishing the current carrying path.

A goal of most circuit interrupter devices is to interrupt the current carrying path as quickly as possible in order to limit let-through energy and thereby to ensure the greatest protection for the load coupled to the device. As the response rates of interrupter designs is increased, however, the problem of catching and retaining the movable contact becomes increasingly more difficult. In particular, the retaining device must allow for extemely rapid opening of the electrical circuit, while intervening as quickly thereafter as possible to prevent the movable contact from rebounding. While advances have been made in trip and retaining devices that have enhanced their rapidity, response rates of such devices appear to be limited by their mass and complexity.

Additional difficulties in conventional multiphase circuit interrupter devices arise from the need to interrupt power to all phases upon the occurrence or the anticipated occurrence of a trip event in one phase. For example, in conventional multiphase circuit breakers and motor protectors, a trip event occurring in one power phase may result in rapid opening of the current carrying path for that phase, while the current carrying paths for the remaining phases will not be interrupted until a shared mechanical or electromechanical actuator assembly can be triggered to displace movable contacts for those phases. In the interim between the initial condition occurring in the first phase and the time at which the actuator mechanism pulls out the remaining phases, the load may be exposed to harmful current levels in the latter phases, potentially resulting in damage to the load.

There is a need, therefore, for an improved apparatus and method for interrupting current in multiphase electrical circuits upon the occurrence of a trip event in one of the phases. There is a particular need for a technique for rapidly causing displacement of movable elements in such power phases that does not rely directly on movement of a shared mechanical or electromechanical actuator assembly. The technique should ideally provide a device for maintaining the phases interrupted until a retention assembly can be displaced to hold the movable elements in their interrupted positions.

SUMMARY OF THE INVENTION

The present invention features an innovative technique for interrupting a current carrying paths in a multiphase electrical circuit designed to respond to these needs. The technique channels energy resulting from displacement of a movable element in one phase to other phases to protect the downstream load fed by the circuit. The energy is thus diverted through an alternate current carrying path around the load. In a preferred arrangement, displacement of the movable element in the first phase results in arcs that become part of the alternate current carrying path. The arcs are conducted into a splitter plate stack from which the energy is conducted to the other phases. In another preferred arrangement, plasma resulting from interruption of the current carrying path of the first phase establishes the alternate current carrying path to the other phases. The technique may be adapted for use in a variety of physical devices, including but not limited to conventional rocker-type circuit breakers and motor protectors, movable spanner-type devices and so forth.

Thus, in accordance with a first aspect of the invention, a method is provided for interrupting current carrying paths in a multiphase electrical circuit interrupter. The interrupter includes at least first and second power phase sections. Each power phase section includes a first contact region and a movable element having a second contact region. The first contact region is electrically coupled to a first conductor, while the second contact region is displaceable with the movable element between a conducting position wherein a current carrying path is established between the first and second contact regions, and an interrupted position wherein the current carrying path is interrupted. In accordance with the method, the second contact region of the first power phase section is displaced from the conducting position toward the interrupted position. A conductive current carrying path is established between the first and the second phase sections to permit the flow of energy therebetween, and the second contact region of the second power phase section is displaced from the conducting position toward the interrupted position.

In accordance with another aspect of the invention, a method is provided for interrupting power in a multiphase circuit interrupter of the type described above. In accordance with this aspect of the invention, an electromagnetic field is generated in response to a trip condition occurring in the first power phase section of the interrupter. The second contact region of the first power phase section is displaced from the conducting position toward the interrupted position under the influence of the electromagnetic field. A conductive current carrying path is established between the first and the second power phase sections to cause a trip condition in the second power phase section. The second contact region of the second power phase section is then displaced from the conducting position toward the interrupted position in response to the trip condition in the second power phase section.

In accordance with another aspect of the invention, multiphase circuit interrupter is provided including a plurality of power phase sections. Each power phase section includes a first contact region and a movable element having a second, movable contact region. The first contact region is electrically coupled to a first conductor. The second contact region is displaceable with the movable element to move the second contact region between a conducting position wherein a current carrying path is established between the first and second contact regions, and an interrupted position wherein the current carrying path is interrupted. The circuit interrupter further includes means for establishing an interphase current carrying path. The interphase current carrying path conducts electrical energy from a first of the power phase sections to a second of the power phase sections during displacement of the first power phase section movable contact region from the conducting position to the interrupted position. The interphase current carrying path may take a number of different forms, including a conductor extending between the power phase sections, or one or more channels in communication with the power phase sections, permitting establishment of the current carrying path by conductive plasma generated during displacement of the movable contact region of one of the power phase sections.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PRESENTLY PREFERRED EMBODIMENTS

Figure 1:
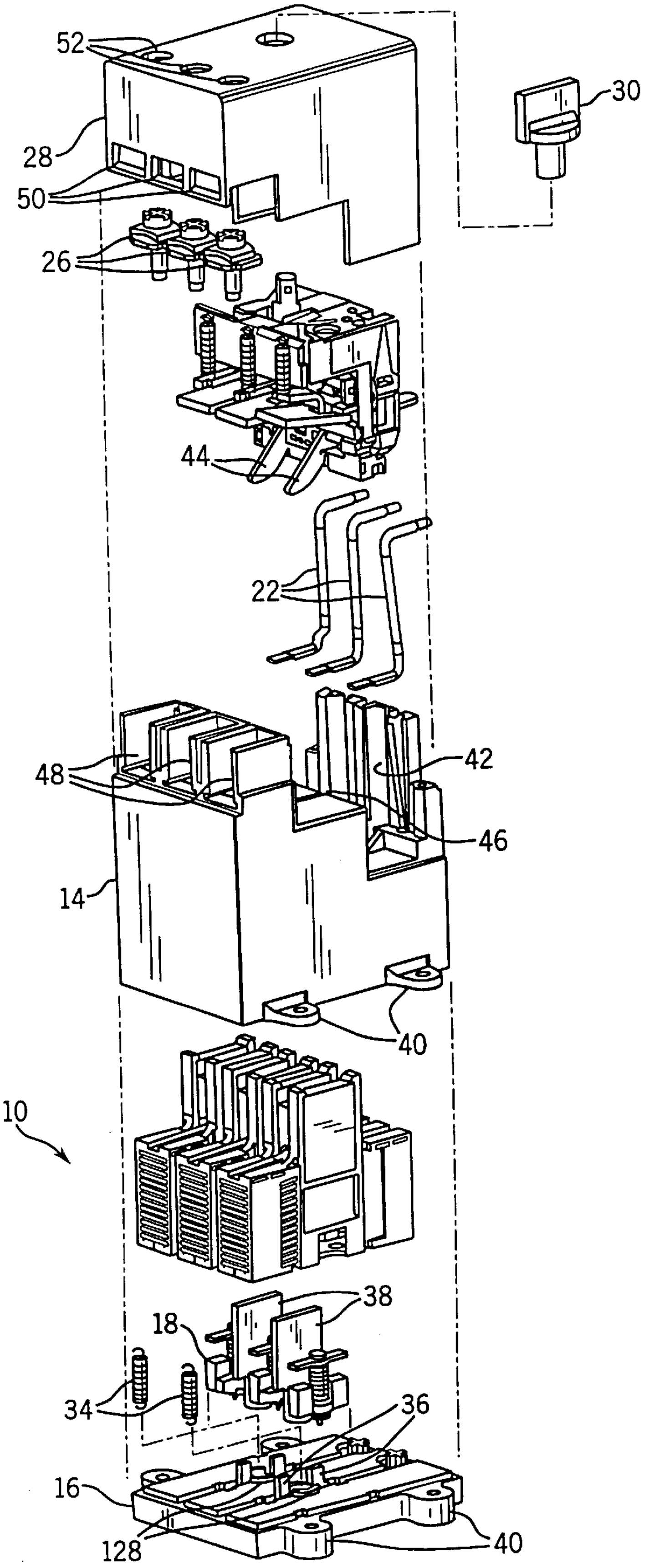
FIG. 1 is an exploded perspective view of the circuit interrupter device for interrupting electrical power in a three phase electrical circuit, illustrating the principle subassemblies of the device.

Turning now to the drawings and referring to FIG. 1, a circuit interrupter, designated generally by the reference numeral 10, is illustrated as including an interrupter module 12, an enclosure or housing 14, a base 16, a spanner/carrier assembly 18 comprising three power phase sections 20, power conductors 22, a mechanical trip/reset assembly 24, terminal assemblies 26 and a cover 28. A manual adjustment knob 30 is also illustrated in FIG. 1 and is designed to operatively fit over an adjustment stem 32 extending from assembly 24 through cover 28 when interrupter 10 is fully assembled. It should be noted that as illustrated in FIG. 1 and as described in the following discussion, interrupter 10 is preferably a three-phase device of the type used to interrupt power to three phases of electrical power. However, to the extent the structure, principles and operation of the device described below are applicable to a single power phase, those skilled in the art will readily appreciate that the device could be adapted to service a single power phase by appropriate modification of the three phase embodiment. It should also be noted that the particular internal construction of mechanical trip/rest assembly 24 does not form part of the present invention and will not be described in detail herein. Such devices are commercially available, such as from Sprecher+Schuh A.G. of Aarau, Switzerland, and generally provide rapid mechanical response to overload and overcurrent conditions and afford a ready means of displacing electrical contact elements until manually or automatically reset.

In the presently preferred embodiment, power phase sections 20 of module 12 are assembled as individual units and are inserted parallel to one another into enclosure 14, as described more fully below. Spanner/carrier assembly 18 is similarly preassembled and is inserted into enclosure 14, supported on base 16 by a pair of biasing springs 34. An array of guide posts 36 extend upwardly from base 16 and aid in locating assembly 18 and in guiding it through its range of movement as described below. Assembly 18 includes a pair of actuator/guide panels 38 extending upwardly into enclosure 14. Panels 38 aid in guiding assembly 18 and contact actuator levers 44 of trip/reset assembly 24 during certain phases of operation of interrupter 10. Following assembly of module 12, assembly 18 and springs 34 in enclosure 14, base 16 is secured to enclosure 14 by screws (not shown) inserted into aligning apertured tabs 40 on enclosure 14 and base 16.

It should be noted that conductors 22 are secured to power phase sections 20 prior to assembly of sections 20 in enclosure 14, and extend upwardly through the enclosure when assembled. A second conductor 58 (see FIGS. 2 and 3) also extends upwardly from each power phase section 20 as described below. Trip/reset assembly 24 is mounted in a bay 42 on enclosure 14, with actuator levers 44 extending through slots 46 provided in an upper wall of enclosure 14. Terminal assemblies 26 are secured to enclosure 14 in appropriate terminal bays 48 and are electrically coupled to second conductors 58 as described below. Cover 28 may then be placed over enclosure 14, terminal assemblies 26 and trip/reset assembly 24. Cover 28 includes conductor apertures 50 and tool apertures 52, permitting conductors (not shown) to be easily connected to terminal assemblies 26 without removal of cover 28.

Figure 2:
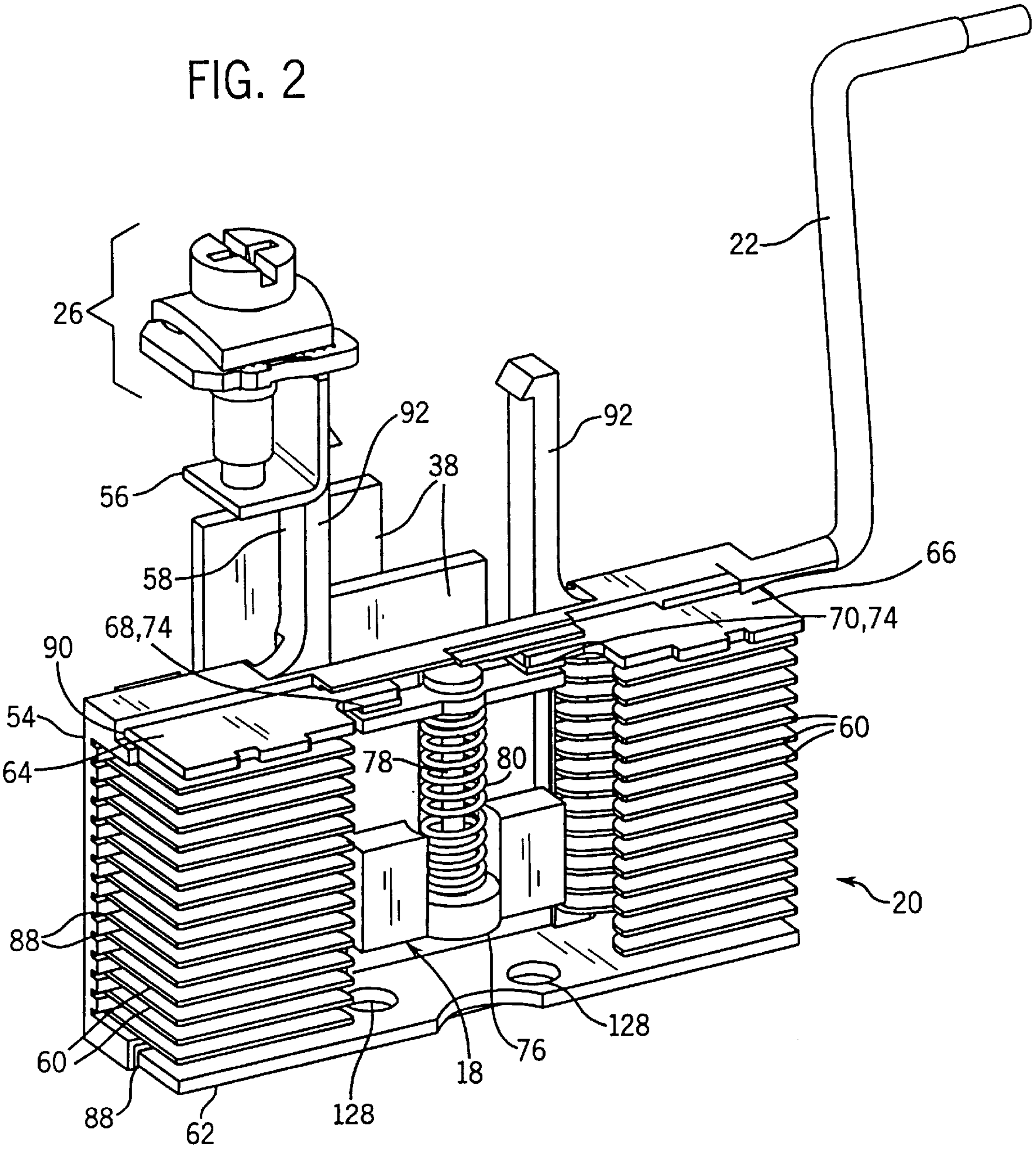
FIG. 2 is a perspective detail view of a power phase section of a circuit interrupter module of the device of FIG. 1, with a side panel of the module removed to illustrate the principle components of the power phase section of the module.
Figure 3:
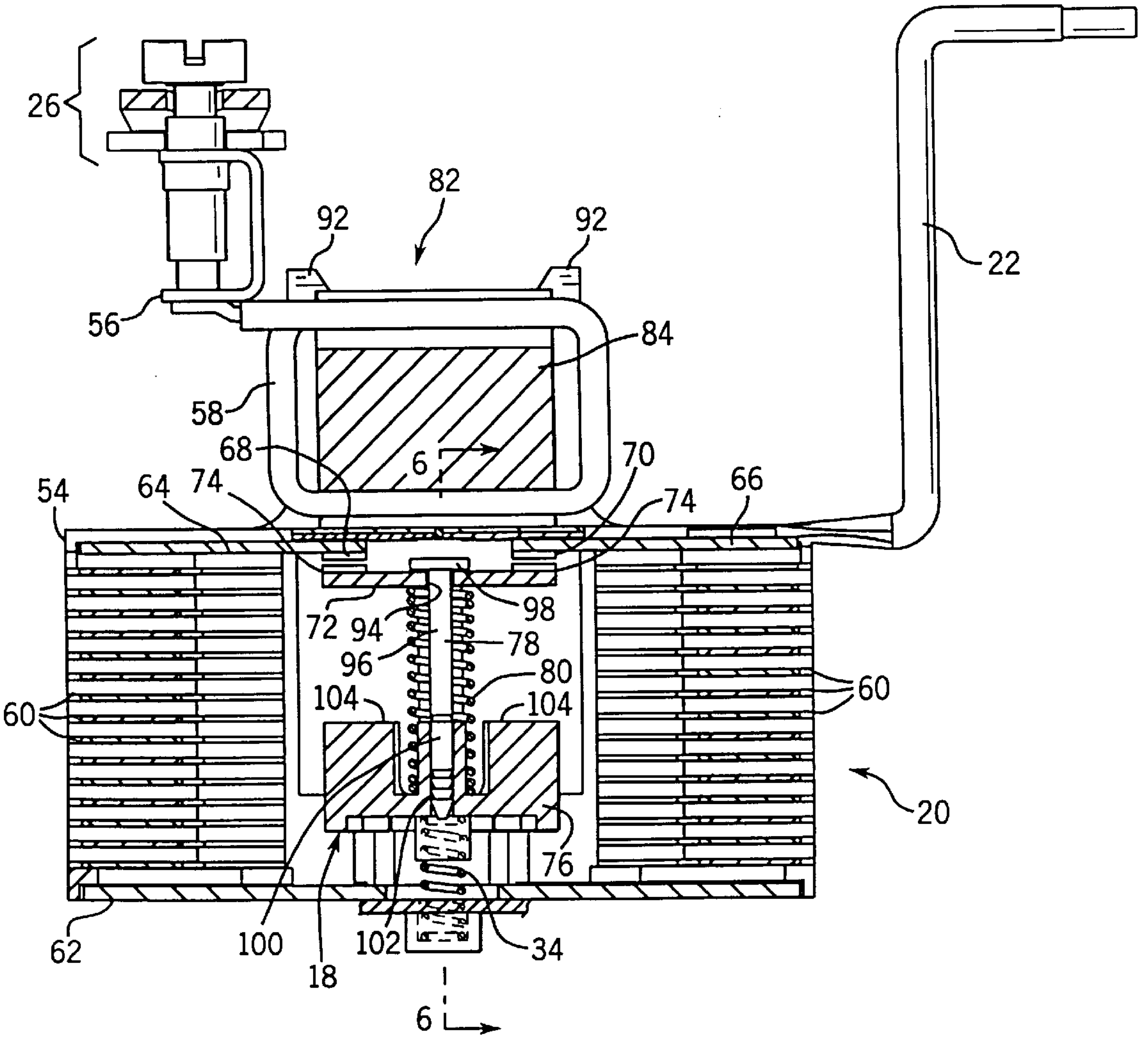
FIG. 3 is a sectional side view of the power phase section shown in FIG. 2 illustrating the electrical connections between the module and conductors for the power phase in which it would be installed.

Referring more particularly now to the preferred construction of interrupter module 12 and spanner/carrier assembly 18, FIGS. 2 and 3 illustrate the components of these assemblies in greater detail. Each power phase section 20 includes a two-piece assembly frame 54 for supporting the various elements of the section. Power is channeled to each section 20 via load side conductor 22, and terminal assembly 26 coupled to a connector clip 56 and therethrough to a second, line side conductor 58. Power phase section 20 includes a stack of splitter plates aligned on both line and load sides and a shunt plate 62 bounding a lower region of the section adjacent to the lower-most splitter plate. A first or line side conductive element 64 is provided atop the line side splitter plates; and a second or load side conductive element is provided in facing relation atop the load side splitter plates. Conductive elements 64 and 66 support stationary contacts 68 and 70, respectively, and are electrically coupled, such as by soldering, to line and load side conductors 58 and 22, respectively. Spanner/carrier assembly 18 includes, for each power phase section 20, a movable conductive element 72, preferably in the form of a spanner, carrying a pair of movable contacts 74 (see FIG. 3). Spanner 72 is supported on a carrier 76 via a pin 78, described more fully below, and is biased into a conducting position by a compression spring 80. In the conducting position of spanner 72, movable contacts 74 abut against stationary contacts 68 and 70 to complete a current carrying path through the power phase section between conductors 58 and 22.

Each power phase section 20 also includes an interrupt initiation device 82, preferably including an electromagnetic core 84 for initiating movement of spanner 72 from its conducting position to an interrupted position in response to overload or overcurrent conditions in the current carrying path defined by spanner 72. Core 84 is preferably configured as set forth in U.S. Pat. No. 5,579,198 issued on Nov. 26, 1996 to Wieloch et al., which is hereby incorporated herein by reference. As illustrated in FIG. 3, at least one of conductors 58 and 22 is preferably wound at least one turn around core 84 to aid core 84 in producing an electromotive force for repelling spanner 72 from its conducting position. In the preferred embodiment, line side conductor 58 encircles core 84 approximately one and three-quarters turns between connector clip 56 and its point of attachment to conductive element 64.

As best illustrated in FIG. 2, assembly frame members 54 of each power phase section 20 preferably include molded features designed to support the components described above. For example, frame 54 includes splitter plate support slots 86 arranged along either side of the section, and a shunt plate recess 88 along a bottom edge. Stationary element support slots 90 are provided near an upper end of each frame 54 for receiving and supporting stationary conductive elements 64. Interrupt initiation device support arms 92 extend upwardly from slots 90 to receive and support interrupt initiation device 82. Moreover, internal surfaces of frame members 54 preferably define guides for spanner 72 to prevent rotation of spanner 72 as it is displaced along pin 78 as described below.

A central aperture 94 is formed through spanner 72 for slidingly receiving pin 78. As best illustrated in FIG. 3, pin 78 includes a shank 96 extending through aperture 94, and a head capturing spanner 72 on shank 96. A base 100 of pin 78 is anchored in a pin support recess 102 of carrier 76. Carrier 76 also includes a pair of abutment or support shoulders 104 for contacting spanner 72 in the event of high velocity displacement of spanner 72 as described below. Shoulders 104 define a spring recess 106 of sufficient depth to fully receive spring 80 in a compressed state in the event spanner 72 is driven fully into contact with shoulders 104.

Figure 5:
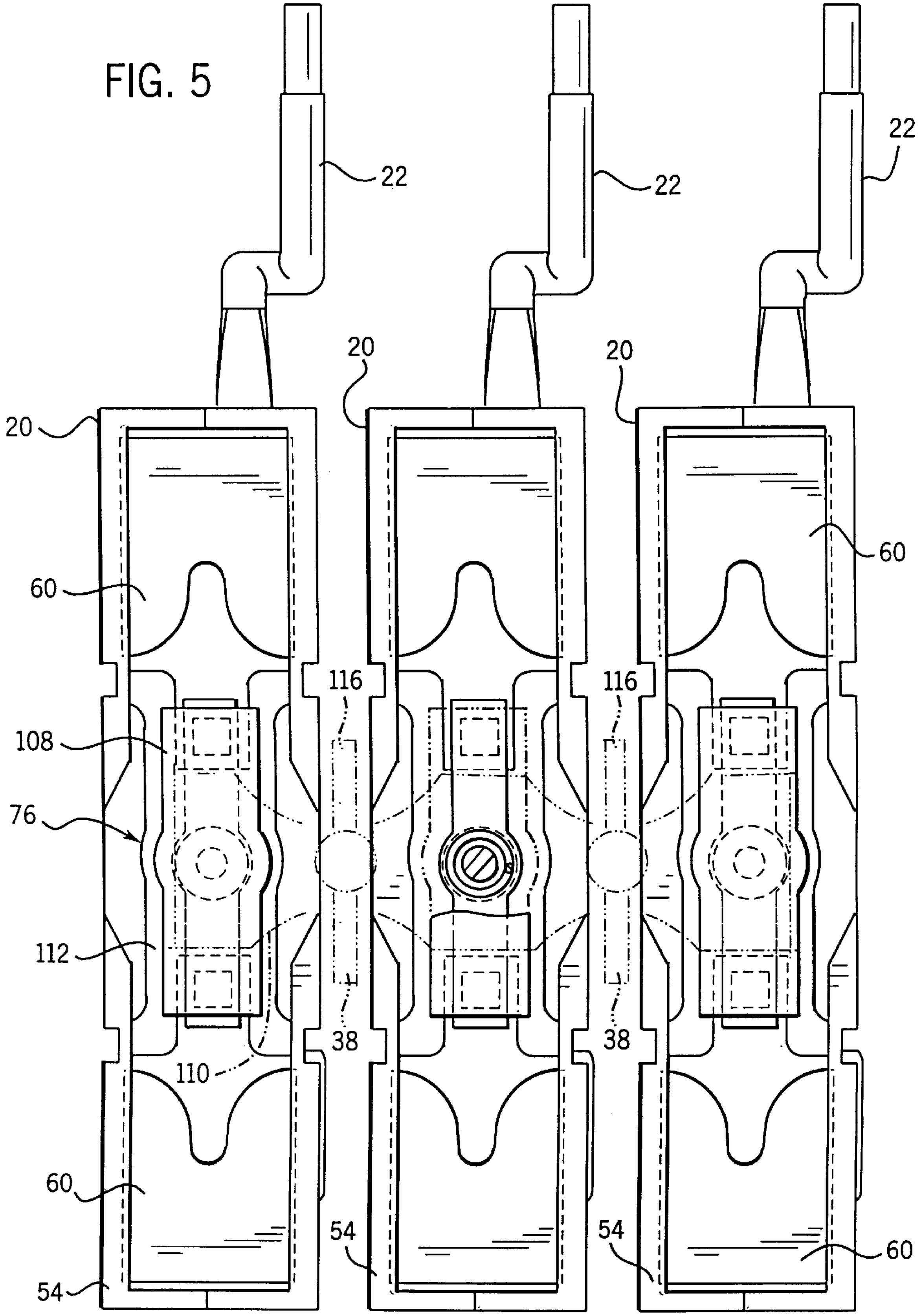
FIG. 5 is an end view of the modules and enclosure of FIG. 4 with the carrier or retainer assembly slidably positioned therein.

While the components described above for each power phase section 20 are generally independent for each section, carrier 76 is preferably common to all power phase sections 20. Thus, as shown in FIG. 5, carrier 76 includes a base panel 108 extending below the three power phase sections 20. Base panel 108 has an external profile, designated by the reference numeral 110, which conforms to a peripheral shape of an internal cavity 112 of the power phase sections when installed in enclosure 14. A plurality of internal walls or dividers 114 are provided within enclosure 14 for supporting power phase sections 20 and for defining the peripheral shape of internal cavity 112. Moreover, internal walls 114, along with assembly frames 54 define elongated slots 116 for receiving and guiding actuator/guide panels 38 of carrier 76. Cavity 112 is sized so as to be generally closed by carrier 76, but to permit sliding movement of carrier within cavity 112.

Figure 4:
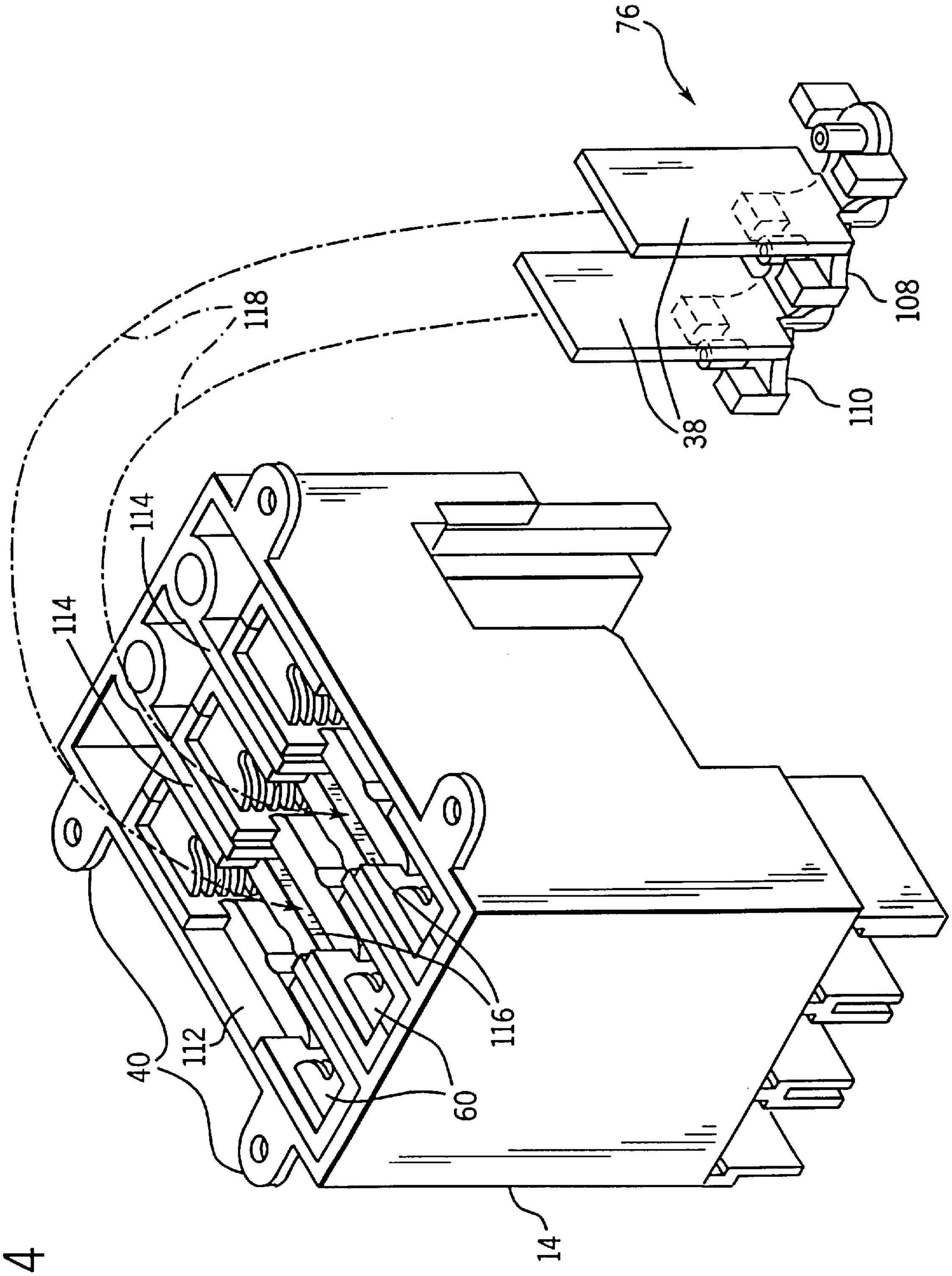
FIG. 4 is a perspective end view of a series of circuit interrupter modules in an enclosure and of a carrier or retainer assembly designed to fit within the enclosure.

For assembly, actuator/guide panels 38 are aligned with slots 116, as indicated by arrow 118 in FIG. 4, and spanner/carrier assembly 18 is slid into place within enclosure 14, placing movable contacts 74 for each power phase section 20 in mutually facing relation with stationary contacts 68, 70 for the respective power phase section. As shown in FIG. 5, once placed in enclosure 14, carrier base 108 covers or bounds a lower extremity of cavity 112. To compete assembly, shunt plates 62 are placed over each cavity 112, springs 34 are positioned in appropriate locations 120 on a bottom side of carrier base 108 and base 16 is fixed in place to close the enclosure.

Figure 6:
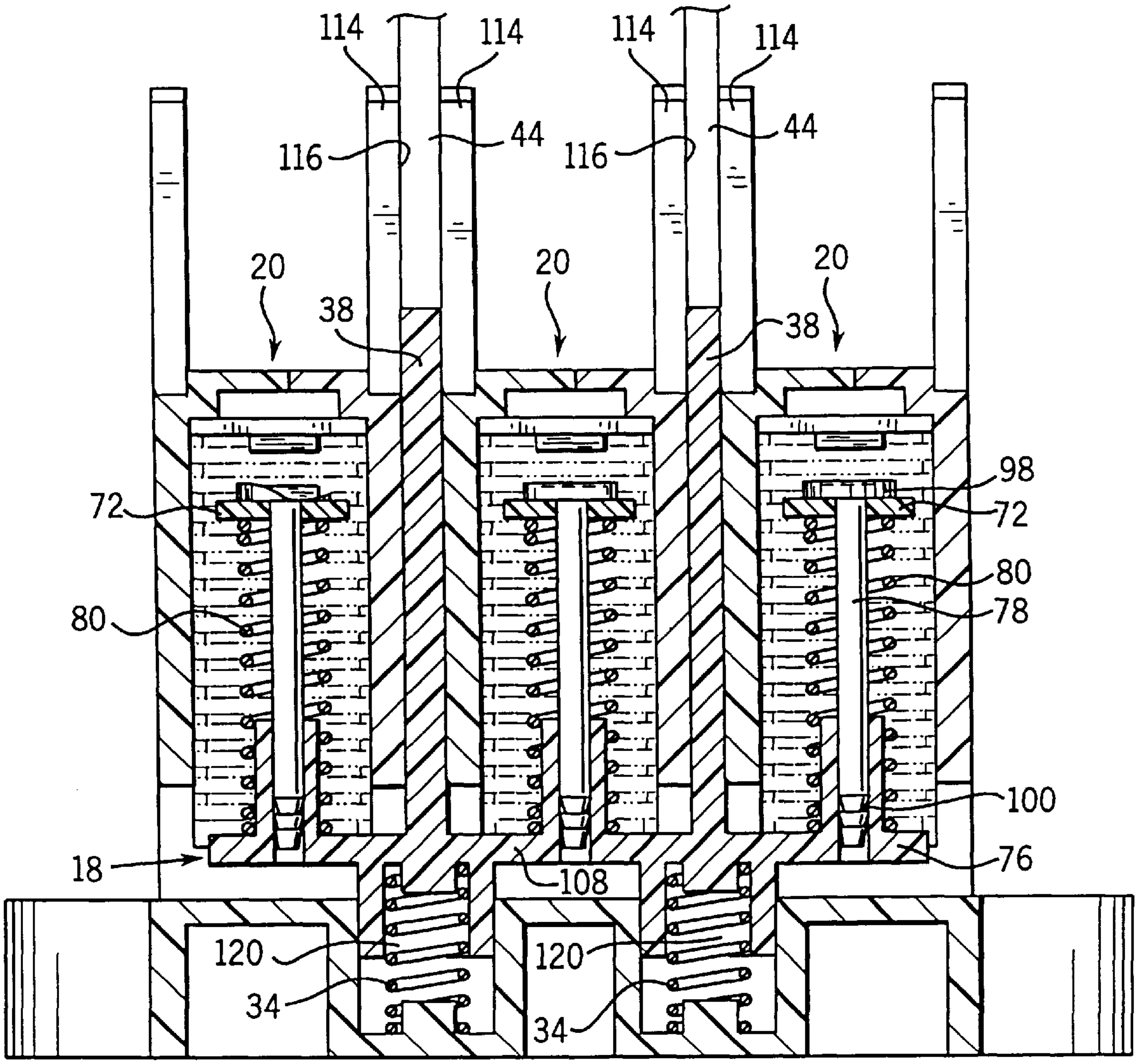
FIG. 6 is a sectional view through the interrupter module and retainer spanner/carrier assembly of FIG. 1 along line 6—6, showing the physical arrangement of the interrupter components.

FIG. 6 illustrates a side sectional view of the internal components described above following their assembly in interrupter 10. As shown in FIG. 6, once assembled, power phase sections 20 are separated within enclosure 14 by internal walls 114. Spanner/carrier assembly 18 is urged upwardly by springs 34 and, from carrier base 108, the spanner 72 of each power phase section 20 is urged upwardly into its conducting position by springs 80, placing movable contacts 74 in abutting relation with stationary contacts 68 and 70, and completing a current carrying path between conductors 58 and 22. Moreover, within enclosure 14, actuator/guide panels 38 are lodged slidingly within guide slots 116. Adjacent to and above panels 38 in guide slots 116 are actuator levers 44 of trip/reset assembly 24.

In operation, spanner/carrier assembly 18 is urged upwardly into its normal operating position as shown in FIG. 6 by springs 34. Spanners 72 are similarly urged upwardly by springs 80, pressing movable contacts 74 into abutment with stationary contacts 68 and 70 to complete a current carrying path through each power phase section 20. It should be noted that pins 78 are of sufficient length that when carrier 76 is in its raised or biased position shown in FIG. 6, spanners 72 may be brought into contact with stationary contacts 68 and 70 without interference from pin head 98.

When a rapid overcurrent condition occurs in any one of the power phase sections, current through conductor 58 of that section generates an electromagnetic field which is intensified and directed by interrupt initiation device 82. This field acts to repel the spanner for the power phase section in which the overcurrent condition occurred, rapidly moving the spanner from its conducting position against the force of spring 80. In the presently preferred embodiment illustrated, arcs are generated between movable contacts 74 and stationary contacts 68 and 70 during movement of a spanner from its conducting position. Conductive elements 64 and 66 serve as arc runners during this phase of operation, routing expanding arcs toward splitter plates 60 on either side of spanner 72. The slight inertia of spanner 72 allows the spanner to move extremely rapidly from its conducting position, resulting in very rapid expansion of the arcs between the movable and stationary contacts, tending to extinguish the arcs. Each interrupter power phase section 20 preferably operates generally in accordance with the method set forth in U.S. Pat. No. 5,587,861 issued on Dec. 24, 1996 to Wieloch et al., which is hereby incorporated herein by reference.

It should be noted that, although in the preferred embodiment movable conductive element 74 is a spanner which is electrically and physically separated from both stationary contacts in its interrupted position, the retaining technique described herein could also be utilized with structures in which a movable element is separated from a single stationary contact, such as in rocker-type devices. Moreover, those skilled in the art may envision various alternative structures for contacting the movable element with a carrier or retainer in accordance with the principles described below without departing from the spirit and scope of the appended claims.

In addition to aiding in driving spanner 72 from its conducting position and rapidly limiting let-through energy, arcs generated during movement of movable contacts 74 from stationary contacts 68 and 70 heat gases within interrupter 10 and thereby aid in retaining spanners in interrupted positions separated from their stationary contacts. In particular, gases confined within internal cavity 112 are heated by arcs resulting from separation of the spanner of any one of power phase sections 20, creating pressure within enclosure 14. Such expanding gases contact carrier base 108 and rapidly drive carrier 76 downwardly toward base 16, against the force of springs 34. Carrier 76 in turn transports pins 78 of each power phase section downwardly, catching the spanner displaced by the electromotive force of its interrupt initiation device against head 98. In the preferred embodiment illustrated, wherein carrier 76 is common to three power phase sections, carrier pins 78 for power phases not initially interrupted by the overcurrent event also contact their respective spanners during displacement of carrier 76, thereby interrupting power to those power phase sections as well.

Figure 7A:
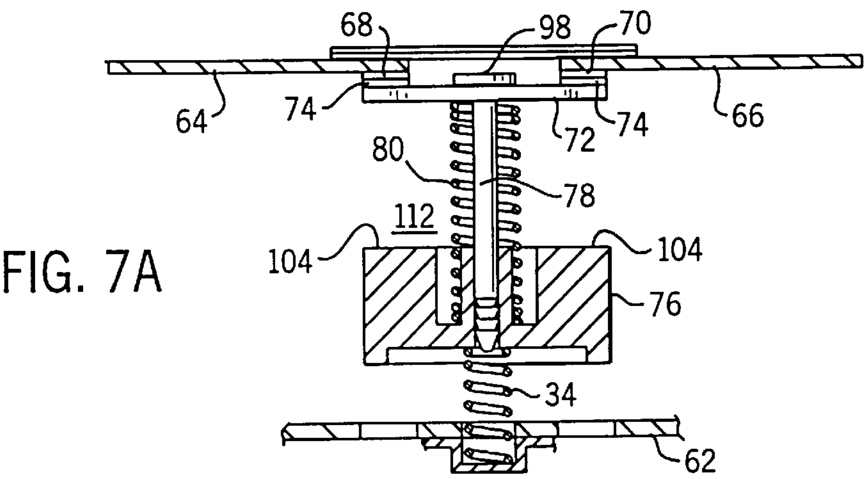
FIGS. 7A–7C are diagrammatical side views of the elements of one power phase section of the module, illustrating respectively, the movable contact element in its closed or conducting position prior to a trip event, in an intermediate position after initial displacement during a trip event, and in an interrupted position after displacement of the carrier.
Figure 7B:
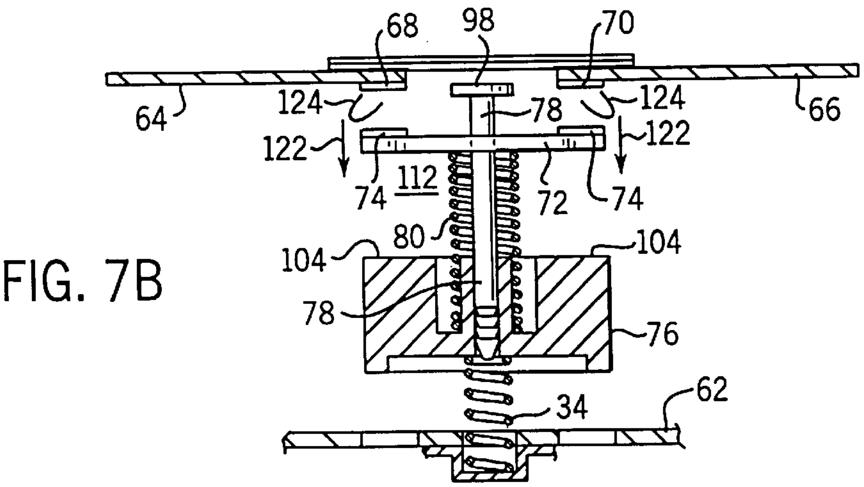
Figure 7C:
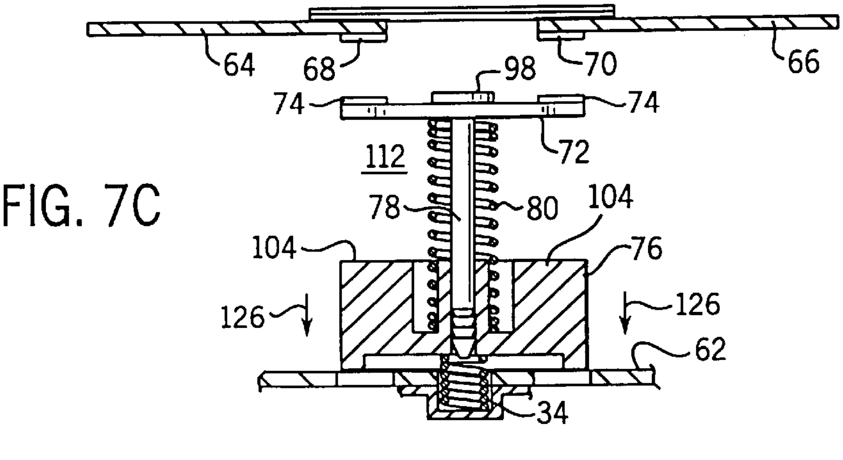

The basic phases of this process are illustrated diagrammatically in FIGS. 7A–7C. FIG. 7A represents carrier 76 in its biased or normal operating position and a spanner 72 in its biased or conductive position prior to a trip event. As shown in FIG. 7B, once interrupt initiation device 82 initiates separation of spanner 72 from its conductive position as indicated by arrows 122, spanner 72 slides downwardly along pin 78 and arcs 124 are generated between movable contacts 74 and stationary contacts 68 and 70. These arcs expand rapidly due to the high velocity of spanner 72 and heat gases within cavity 112. Pressure resulting from these gases drives carrier 76 downwardly, as indicated by arrows 126, against the force of springs 34 until carrier base 108 contacts shunt plates 62 (or base 16). In this lowered or retaining position of carrier 76, head 98 of pin 78 contacts an upper side of spanner 72, restraining spanner 72 from rebounding and recontacting stationary contacts 68 and 70. If spanner 72 is displaced with sufficient force, spanner 72 may contact shoulders 104 of carrier 76, protecting spring 80 from being crushed or damaged.

It should be noted that, while sufficient clearance is provided within cavity 112 for relatively free sliding movement of carrier 76, carrier base 108 fits sufficiently tightly within cavity 112 to displace carrier 76 before gas pressure can dissipate following generation of arcs from displacement of a spanner. Moreover, vents 128 are preferably provided in base 16, behind carrier base 108, through which gases eventually dissipate following displacement of carrier 76. Thus, carrier 76 is driven into its retaining position by expanding gases within enclosure 14 and is held in the retaining position for the period of time necessary for gas pressure to dissipate by leakage around carrier base 108 and through vents 128 (and any other openings in enclosure 14). Eventually, as gas pressure dissipates within enclosure 14, springs 34 will overcome forces against carrier 76 resulting from the gas pressure, and carrier 76 will again return to its biased position, thereby resetting interrupter 10.

While the dissipation of gas pressure within enclosure 14 may be used to reset interrupter 10, in the preferred embodiment illustrated, mechanical trip/reset assembly 24 is preferably also tripped following an overcurrent condition. Tripping of assembly 24 results in movement of actuator levers 44 downwardly within guide slots 116 (see FIG. 6), to a point where actuator levers 44 contact actuator/guide panels 38 of carrier 76 to hold carrier 76 in its interrupted or retaining position. Response of assembly 24 preferably occurs prior to dissipation of gas pressure within enclosure 14 sufficient to permit return of carrier 76 to its normal or biased position. Once tripped, assembly 24 will hold carrier 76 in the retaining position until reset in a conventional manner via knob 30. It should also be noted that, while spanner 72 and carrier 76 are designed to respond extremely quickly to overcurrent conditions, mechanical trip/reset assembly 24 is adapted to respond to more slowly occurring conditions, such as thermal overloads.

Figure 8:
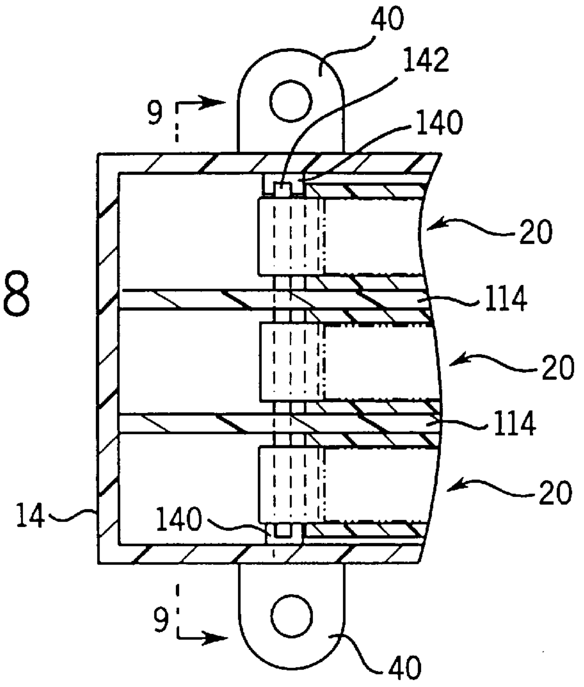
FIG. 8 is a bottom view of an interrupter module within its enclosure, illustrating a first preferred configuration for triggering interruption of parallel phase sections in the interrupter following initial interruption of one phase section.
Figure 9:
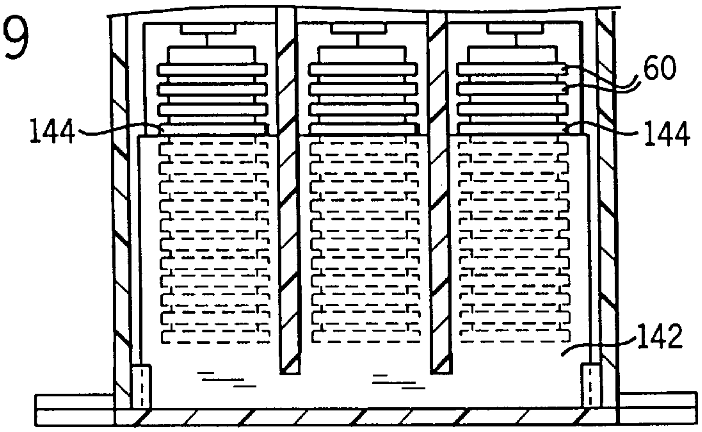
FIG. 9 is a sectional side view of the embodiment of FIG. 8 along line 9—9, illustrating the position of a conductive element within the interrupter to transmit energy during interruption of one phase section to parallel phase sections.
Figure 10:
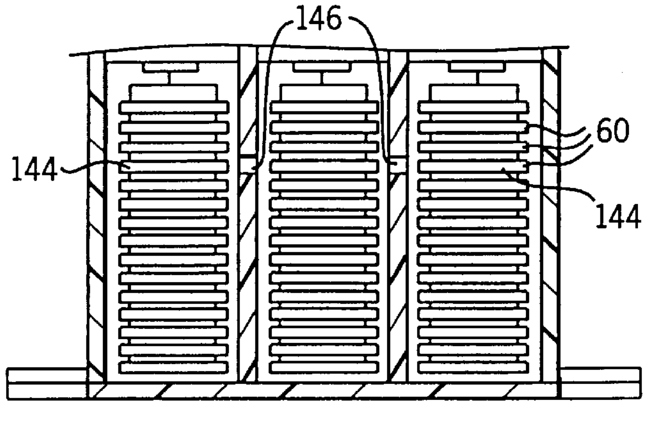
FIG. 10 is a sectional side view of an alternative embodiment of the device wherein interruption of parallel phase sections is triggered by conductive plasma.

FIGS. 8–10 illustrate a preferred technique for rapidly interrupting current carrying paths in parallel power phase sections 20 of interrupter 10. In accordance with this technique, once a trip event, such as a rapid overcurrent condition, occurs in one of the power phase sections 20, the conductive element 74 of that power phase section is displaced in the manner described above, opening the current carrying path through that power phase section. Prior to complete interruption of this current carrying path, however, energy from the opening power phase section is conveyed to other power phase sections within the device to shunt power through the other power phase sections. The resulting transitory circuit is thus established between the incoming conductor of the opening power phase section, stationary contacts of that section, the moving conductive element of the section, arcs established between the movable and stationary contacts, and an interphase conductor. It has been found that this arrangement may considerably increase the investment in the arcs in the opening section, and provoke rapid opening of the remaining sections.

FIGS. 8 and 9 illustrate a first preferred arrangement for establishing the interphase current carrying path. In the embodiment shown in FIG. 8, enclosure 14 includes a pair of shunt plate supports 140, formed integrally with enclosure 14 and walls 114 thereof. Supports 140 open in mutually facing relation for receiving a conductive plate 142 in an upright position. Plate 142 extends across power phase sections 20 within enclosure 14, resting adjacent to base 16 on the load side of interrupter 10. Plate 142 extends upwardly within each power phase section, with internal walls 114 lying between separate upward extensions. Plate 142 thus extends upwardly into the region of power phase sections 20 wherein splitter plates 60 are disposed. It is believed that the transitory current carrying path afforded by interphase plate 142 is best established when plate 142 extends into approximately the middle to upper one-third of the splitter plate stack. In the embodiment illustrated in FIGS. 8 and 9, the fourth splitter plate in the stack, designated 144 (counting from the plate closest to the stationary contacts), extends slightly farther laterally than other splitter plates in the stack, to physically contact plate 142.

Various alternative embodiments may be envisioned for establishing the interphase current carrying path between power phase sections 20. In a preferred alternative embodiment, illustrated in FIG. 10, channels 146 are formed through interior walls 114. While such channels may be formed in various locations along walls 114, at least one such channel is preferably formed adjacent to the middle to upper one-third of the splitter plate stack, such as in the vicinity of the fourth splitter plate 144. In operation, electrically conductive plasma generated by arcs between the moving conductive element 72 and the stationary contacts 68, 70 (see FIG. 7B) establishes the interphase current carrying path for transmitting energy between the power phase sections 20.

In tests, the foregoing conductor arrangement has been shown to reduce very rapidly the load current relative to the rise in total fault current. In one test circuit, for example, using 400 v and 16 kA available at 1 ms, a typical fast circuit breaker limited fault current to approximately 4 kA with a current aperture time of 0.6 ms and let-through energy of approximately 4,000 A-coul. into a short circuited (i.e., “crowbar”) load. Wish the conductor interphase current carrying path arrangement described above, peak load current was less than 1.5 kA and load current was terminated in approximately 0.2 ms, with let-through energy of approximately 800 A-coul.

While the embodiments illustrated in the Figures and described above are presently preferred, it should be understood that these embodiments are offered by way of example only and may be adapted to various other structures.

What is claimed is:

1. A multiphase circuit interrupter comprising:

a plurality of power phase sections, each power phase section including a first contact region and a movable element having a second, movable contact region, the first contact region being electrically coupled to a first conductor, the second contact region being displaceable with the movable element between a conducting position wherein a current carrying path is established between the first and second contact regions, and an interrupted position wherein the current carrying path is interrupted; and means for establishing an interphase current carrying path, the interphase current carrying path conducting electrical energy from a first of the power phase sections to a second of the power phase sections during displacement of the first power phase section movable contact from the conducting position to the interrupted position.

2. The interrupter of claim 1, wherein the means for establishing an interphase current carrying path includes a conductive element extending between the power phase sections.

3. The interrupter of claim 1, wherein each power phase section includes a plurality of splitter plates disposed adjacent to the movable contact, and wherein the means for establishing an interphase current carrying path includes at least one of the splitter plates.

4. The interrupter of claim 3, wherein the means for establishing an interphase current carrying path includes a conductive element extending between splitter plates of the first and second power phase sections.

5. The interrupter of claim 1, wherein the interrupter includes a housing supporting the power phase sections, and wherein the means for establishing an interphase current carrying path includes at least one channel in communication with the first and second power phase sections.

6. The interrupter of claim 5, wherein the means for establishing an interphase current carrying path includes plasma generated within the housing by movement of the first power phase section movable contact, the plasma establishing the interphase current carrying path via the at least one channel.

7. The interrupter of claim 1, further comprising a movable contacting the movable element of the first power phase section to prevent return of the first power phase section movable element to the conducting position following displacement thereof toward the interrupted position.

8. The interrupter of claim 7, wherein the retainer also contacts the movable element of the second power phase section to prevent return of the second power phase section movable element to the conducting position following displacement thereof toward the interrupted position.

9. A multiphase circuit interrupter comprising:

a first and second power phase section, each power phase section having a first and a second stationary contact region;

a moveable element in each power phase section, the moveable element having a conducting position and a non-conducting position wherein the moveable element electrically couples the first and second stationary contact regions while in the conducting position; and an interphase current carrying path, conducting electrical energy from the first power phase to the second power phase upon displacement of one of the moveable elements from the conducting position to the non-conducting position.

10. The multiphase circuit interrupter of claim 9, wherein the interphase current carrying path comprises a conductive element between the first and second power phase sections.

11. The multiphase circuit interrupter of claim 9, wherein the interphase current carrying path comprises a plurality of splitter plates disposed adjacent to the movable element.

12. The multiphase circuit interrupter of claim 9, further comprising a housing to support the first and second power phase sections, wherein the interphase current carrying path comprises a communicative channel between the first and second power phase sections.

13. The multiphase circuit interrupter of claim 12, wherein the interphase current carrying path further comprises plasma generated within the housing by displacement of the moveable element from the conducting position to the non-conducting position, current being carried by the plasma through the communicative channel.

14. The multiphase circuit interrupter of claim 9, further comprising a movable retainer in contact with one of the movable elements, the moveable retainer maintaining the moveable element in the non-conducting position after the moveable element has been displaced from the conducting position.

15. The multiphase circuit interrupter of claim 14, wherein both moveable elements are maintained in the non-conducting position by the moveable retainer upon displacement from the conducting position.

16. A multiphase circuit interrupter comprising:

a first, second and third power phase section, each power phase section having a first and a second stationary contact region;

a housing to support the first, second and third power phase sections;

a moveable element in each power phase section, the moveable element having a conducting position and a non-conducting position wherein the moveable element electrically couples the first and second stationary contact regions while in the conducting position; and an interphase current carrying path, conducting electrical energy between the power phase sections upon displacement one of the moveable elements from the conducting position to the non-conducting position.

17. The multiphase circuit interrupter of claim 16, further comprising a movable retainer in contact with one of the movable elements, the moveable retainer maintaining the moveable elements in the non-conducting position after the moveable elements have been displaced from the conducting position.

18. The multiphase circuit interrupter of claim 17, wherein each moveable element is maintained in the non-conducting position by the moveable retainer upon displacement from the conducting position.

19. The multiphase circuit interrupter of claim 16, wherein the interphase current carrying path comprises plasma generated within the housing by displacement of a moveable element from the conducting position to the nonconducting position, the current being carried by the plasma through a communicative channel.

20. The multiphase circuit interrupter of claim 16, wherein the interphase current carrying path includes a conductive element extending between the power phase sections within the housing.

* * * * *